Patented Apr. 29, 1941

2,240,159

UNITED STATES PATENT OFFICE 2,240,159

REFRACTORY CEMENT

Otis L. Jones, Joliet, Ill., assignor to The Illinois Clay Products Company, Joliet, Ill., a corporation of Illinois No Drawing. Application November 4, 1937, Serial No. 172,737

4 Claims. (Cl. 106—9)

This invention relates to refractory cements, and among other objects aims to provide a cement suitable for use with refractories exposed to high temperatures.

The nature of the invention may be readily understood by reference to an illustrative embodiment thereof described in the following specification.

In laying refractories, such as silica fire-brick, in furnaces or the like where very hot temperatures are encountered, the cement joints must be kept very thin so as to minimize exposure of the cement material to the action of high temperatures and gases. Even though the cement be quite refractory, it is generally damaged by the heat in other respects, such as cracking and chipping, much more so than the silica brick. It is, therefore, important to lay up the brick with practically a brick to brick contact, the cement serving merely to bond the brick and to fill up inequalities between the adjacent brick surfaces to prevent leakage of hot gases. It has been so difficult heretofore to form a thin joint with refractory cement that in some types of work exposed to very high temperatures the brick are laid without cement. For example, this has been the practice in laying the silica brick roofs in open hearth furnaces, despite the leakage which results from the inequalities in the silica brick. Such leakage is objectionable not only because of loss of heat but because of the unequal heating of exposed brick, thereby causing cracking and frequently resulting in the dropping of a portion of a brick into the furnace.

Ordinary plasticizing agents used in cements are not satisfactory for high temperature cements, first because the plasticizing agents such as clay reduce the refractoriness of the cement, and, second, such plasticizing agents do not maintain the plasticity of the cement against the suction of the brick. Silica brick, because of their high porosity, have an exceptionally great suction and abstract the water from the cement long before another brick can be laid on the joint, thereby leaving a relatively hard and dry cement which is incapable of thinning down under the pressure of the brick to provide the aforesaid brick to brick contact or of flowing to fill in the inequalities between the brick. To function satisfactorily for the aforesaid purposes, the cement even when spread in thin layers on the brick must be capable of retaining its plasticity (i. e. preventing abstraction of water) for about two minutes, this being normally the time required for the mason to lay up the next course of brick on the cement. When thus laid, the cement must thin down to permit practically a brick to brick contact and must flow to fill the inequalities between the faces of the brick to seal the joint and to provide an adequate cementing contact.

The illustrative cement combines not only superior refractory qualities but high plasticity and the capacity to hold water (to maintain its plasticity) against the suction of the brick, even when spread in a thin layer on a silica brick, for a period substantially longer than two minutes. Water is retained in the aforesaid cement by the use of a small amount of organic gums which not only have the property of absorbing a substantial amount of water but of holding such water against the water-abstracting forces (suction) of silica brick or other porous refractories. The illustrative cement comprises silica as the refractory material, a fraction of a percent of Karaya gum which cooperates to retain water and maintain the plasticity of the cement, and a small amount of suspending material which maintains the silica in suspension upon the addition of water to the cement. Other gums, such as tragacanth, galagum, and a number of other gums sold under trade-names, also have the power of holding water against the suction of the brick and are, therefore, satisfactory for use in place of Karaya. However, the latter is preferred because of its relatively low cost. As a suspending agent bentonite is advantageous because it may be used in such small amounts as not to affect the refractoriness of the cement or to cause substantial fluxing thereof at too low temperatures. While the bentonite itself absorbs a relatively large volume of water, it is not capable of holding such water against the suction of the brick. However, if used in such quantities as to serve as the water-holding ingredient, it would result in a substantial reduction in the refractoriness of the cement. While for other types of refractories a different refractory material might be used, silica is the preferred refractory ingredient of cement for cementing silica brick.

Any appropriate form of silica, preferably of relatively high purity, may be used. Dell Abey, Ottawa sand and potter's flint are well-known sources of silica, and any of these or mixtures of these may be employed. The sand is preferably ground to about 50 or 60 mesh in a mill which will produce some finer material so that the fineness ranges from 50 to about 100 mesh. This results in improved working properties and a denser and stronger cement. Preferably all of the ingredients are batch-ground together in a mill, such as a pebble mill, to promote an intimate mixture of the ingredients and to secure a uniform distribution of the small amounts of gum and bentonite. Batch grinding seems to produce much more satisfactory results than continuous grinding.

Good results have been obtained by the addition of a small amount of a good grade of plastic fire clay having a medium silica content, i. e. 50-60% silica. This considerably improves the working and spreading qualities but for reasons not now fully understood does not materially affect the refractory qualities of the cement, despite the fact that the clay alone has a fusion point of about 2800° F., which is below that of the fusion point of the cement. Heretofore it has been considered essential to use only high silica clays in high temperature refractory cement. By the use of a medium silica cement, the cement has a wider zone of strength, yet its refractory qualities are not reduced. Proportions up to 10% of such clay may be used to advantage.

An increase in refractoriness may be obtained by the use of a small percentage of finely ground phosphate rock (tricalcium phosphate). The phosphate rock is believed to promote the formation of tridymite in the silica, thereby increasing the stability of the cement. A cement of this character containing about 4% of phosphate rock has a refractoriness of about Cone 32, that is, 3092° F. An even smaller amount of phosphate rock may be used without reducing the refractoriness but approximately 4% gives the cement improved working qualities. Phosphate rock itself is not plastic but when finely ground it has an effect similar to a plasticizing agent in giving the cement improved working qualities. One satisfactory cement comprises silica 93.7%, bentonite 2%, Karaya gum .3%, phosphate rock 4%. The aforesaid clay may also be used in cements containing the phosphate with similar increase in the zone of strength.

A cement having the composition of the foregoing cements has a water retention period of nearly five minutes, thereby allowing more than ample time for the laying up of the next course of brick. It has substantially the same coefficient of expansion as silica brick and the joint is, therefore, not disturbed by the heating and cooling of the furnace. There is, of course, no tendency for the cement and the brick to react chemically at high temperatures.

Karaya gum or other water retaining material does not impair refractoriness of the cement inasmuch as it is decomposed at a relatively low temperature.

Obviously the invention is not limited to the details of the illustrative cements since these may be variously modified. Moreover it is not indispensable that all features of the invention be used conjointly since various features may be used to advantage in different combinations and subcombinations.

Having described my invention, I claim:

1. A refractory cement for bonding silica brick comprising in combination a high purity silica finely subdivided into varying sizes ranging from 50 mesh and smaller, a fraction of a per cent of water retaining gum, a small amount not exceeding 10% of plastic fireclay having a medium silica content, and about 2% of bentonite to maintain the solid materials in suspension in the cement when mixed with water, said cement having a fusion point of about 3000° F.

2. A refractory cement for bonding silica brick comprising in combination a high purity silica finely subdivided into varying sizes ranging from 50 mesh and smaller, a small amount not exceeding 10% of plastic fireclay having a medium silica content, about 2% of bentonite to maintain the solid materials in suspension in the cement when mixed with water, and an amount of water-retaining gum sufficient to maintain the plasticity of the cement for about two minutes when spread in a thin layer on silica brick, said amount not exceeding a fraction of a per cent.

3. A refractory cement for binding silica brick comprising high purity silica finely ground to varying sizes, a small amount of plastic fireclay having a medium silica content, a fraction of a per cent of Karaya gum to maintain the plasticity of the cement for about two minutes after it has been applied, and a small amount of bentonite for suspending the solid materials in the cement, the amount of bentonite being insufficient substantially to reduce the fusion point of the cement.

4. A refractory cement for bonding silica brick comprising in combination a high purity silica finely subdivided into varying sizes ranging from 50 mesh and smaller, a small amount not exceeding 10% of plastic fireclay having a medium silica content, about 2% of bentonite to maintain the solid materials in suspension in the cement when mixed with water, and an amount of water-retaining gum of the class consisting of Karaya, tragacanth and galagum, said amount not exceeding a fraction of a per cent, the materials in said cement being batch ground so that the small amounts of gum and bentonite will be effectively distributed throughout the cement.

OTIS L. JONES.